UNITED STATES PATENT OFFICE 1,920,465

REFINING FERROUS METALS

Herbert Harris, Milwaukee, Wis., assignor to A. O. Smith Corporation, Milwaukee, Wis., a Corporation of New York No Drawing. Application October 5, 1931
Serial No. 567,129

13 Claims. (Cl. 75—27)

The invention relates to refining ferrous metal and especially to the removal of such impurities as sulphur and phosphorus.

One of the objects of the invention is to rapidly reduce to low values undesired amounts of impurities by treating the molten metal with a fusible, slag-forming purifying material for a short time, such as that which would be permitted during the time of pouring, and holding the metal in a ladle, say 5 to 20 minutes.

Other objects of the invention will appear in connection with the following description of the invention.

According to the invention, I provide a fusible composition or reagent which comprises a fluoride of an alkali metal and an oxide of an alkaline earth metal, and treat the fused ferrous metal a short time with this composition. Since the carbonates of alkaline earth metals readily yield the oxides at temperatures which are moderate as compared to the melting points of ferrous materials, the carbonate is to be considered the equivalent of the oxide for the purposes of this invention.

As illustrations of the invention, the following are mentioned:

1. A mixture composed of one part by weight sodium fluoride and two parts calcium oxide was made. Cast iron having a sulphur content of about 0.2% was melted in a high frequency induction furnace and an amount of the mixture equal to about 3% of the weight of the metal was added. The charge was held in the furnace for about 10 minutes and subjected to the agitating action of the induction furnace. After pouring the metal, it was found that the sulphur content had been reduced to 0.023%.

2. Another composition was made by mixing 1 part by weight of sodium fluoride and 3 parts calcium carbonate. About 4% by weight of this composition was added to a charge of steel which was contained in a high frequency induction furnace. The steel was treated for about 20 minutes in the furnace and poured. Before treatment the steel contained 0.153% sulphur and 0.105% phosphorus. After treatment it was found that the sulphur content was 0.033%, the phosphorus was 0.012%.

It has been found that compositions containing carbonate can be used with excellent results on both high and low carbon ferrous materials. The mixtures which contain carbonate are preferred for treating ferrous materials of the lower carbon contents. Other substances besides calcium oxide and sodium fluoride can be present in the fusible material which is added to the metal provided the mixture is a fusible composition which is at least as basic in its properties as a mixture of about one to two parts lime and one part sodium fluoride. For example, aluminum fluoride is not deleterious when a small amount of an alkali, such as sodium carbonate is used to preserve the basic character of the lime and sodium fluoride mixtures. Accordingly, materials which contain sodium fluoride and aluminum fluoride, such as cryolite can be used as the source of sodium fluoride. As the basic material sodium carbonate can be used in conjunction with the alkaline earth oxide or carbonate when aluminum fluoride is present. About 5 parts by weight of sodium carbonate to 8 parts by weight of aluminum fluoride in the composition gives good results. For example, a suitable composition comprising cryolite may consist of using about 1½ parts cryolite and about ½ part sodium carbonate instead of one part sodium fluoride in the described lime-sodium fluoride compositions. It is to be understood that calcium carbonate equivalent to the lime can be used.

Considerable variation in the proportion of lime to sodium fluoride can be used. About 1 to 8 parts lime by weight can be used with about 2 parts of sodium fluoride. When materials are used which contain sodium fluoride and other substances, such as cryolite, the amount of material must be increased in proportion to the sodium fluoride to be included in the mixture. In the purification of ferrous material, such as iron and steel alloys, the temperature of the bath may be widely varied. The temperature of treatment is not critical since equally successful results can be produced at the melting temperatures of ferrous materials as can be produced when the melted materials are superheated.

The time required to effect the removal of the impurities varies somewhat in accordance with the amount of fusible purifying reagent used and with the amount of agitation. With good agitation, such as that which can be produced in pouring the metal into a ladle or that produced by an induction furnace, a charge of reagent equal to about 1% to 4% of the charge will materially reduce the impurities in about 5 to 20 minutes but the proportion of reagent to charge and the time of treatment may be longer or shorter as other conditions of the treatment may require.

The equivalency of alkaline earth carbonates to alkaline earth oxides in accordance with the invention is approximately proportioned to the molecular weight of these compounds. For example, about 1 to 14 parts calcium carbonate is equivalent to 1 to 8 parts of calcium oxide.

The invention is not limited to the specific embodiments herein disclosed. Non-deleterious impurities may be present in the mixtures. Equivalent proportions of various materials which contain available alkali fluorides and available alkaline earth oxides may be used instead of sodium fluoride and calcium oxide. No limitations are intended in the annexed claims except those which are recited or imposed by the prior art.

I claim:

1. The process of purifying ferrous metal which comprises treating the molten metal with a reagent containing a fluoride of an alkali metal and an oxide of an alkaline earth metal.

2. The process of purifying ferrous metal which comprises treating the molten metal with a reagent containing a fluoride of an alkali metal and a carbonate of an alkaline earth metal.

3. The process of removing sulphur and phosphorus from ferrous metal which comprises treating the molten metal with a reagent containing a fluoride of an alkali metal and a carbonate of an alkaline earth metal.

4. The process of purifying ferrous metal which comprises treating the molten metal with a reagent containing a fluoride of an alkali metal and oxide of calcium.

5. The process of removing sulphur and phosphorus from ferrous metal which comprises treating the molten metal with a reagent containing a fluoride of an alkali metal and carbonate of calcium.

6. The process of removing sulphur from ferrous metal which comprises treating the molten metal with a reagent containing cryolite, an oxide of an alkaline earth metal, and a carbonate of an alkali metal.

7. A composition for removing sulphur from fused ferrous material which comprises a mixture of an alkali metal fluoride, and an alkaline earth metal oxide.

8. A composition for removing sulphur and phosphorus from fused ferrous material which comprises a mixture of an alkali metal fluoride, and an alkaline earth metal carbonate.

9. A composition for removing impurities from fused ferrous material which comprises about two parts by weight of alkali metal fluoride, and about one to eight parts by weight of alkaline earth metal oxide.

10. A composition for removing sulphur from fused ferrous material which comprises a mixture of two parts by weight of sodium fluoride and from one to eight parts of calcium oxide.

11. A composition for removing sulphur and phosphorus from low carbon fused ferrous material which comprises about two parts by weight of alkali metal fluoride, and about one to ten parts by weight of alkaline earth metal carbonate.

12. A composition for removing sulphur and phosphorus from low carbon fused ferrous material which comprises a mixture of two parts by weight of sodium fluoride and from one to fourteen parts of calcium carbonate.

13. A composition for removing sulphur from fused ferrous metal which comprises a mixture of three parts cryolite, four parts calcium oxide and one part sodium carbonate.

HERBERT HARRIS.